(12) United States Patent
Mathias et al.

(10) Patent No.: US 7,606,784 B2
(45) Date of Patent: Oct. 20, 2009

(54) UNCERTAINTY MANAGEMENT IN A DECISION-MAKING SYSTEM

(75) Inventors: Keith Eugene Mathias, Parker, CO (US); Mark Robert Nixon, Topanga, CA (US); Patrick James Talbot, Colorado Springs, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 403 days.

(21) Appl. No.: 11/196,647

(22) Filed: Aug. 2, 2005

(65) Prior Publication Data

US 2007/0094216 A1   Apr. 26, 2007

(51) Int. Cl.
G06N 7/02 (2006.01)
G06N 7/06 (2006.01)
(52) U.S. Cl. ............................... 706/52; 703/2; 702/20
(58) Field of Classification Search ................... 706/52, 706/62; 709/223, 225, 228; 714/43
See application file for complete search history.

(56) References Cited

U.S. PATENT DOCUMENTS

| | | | |
|---|---|---|---|
| 4,860,213 A * | 8/1989 | Bonissone | .................. 706/52 |
| 5,434,955 A | 7/1995 | Kumamoto | |
| 5,963,653 A | 10/1999 | McNary et al. | |
| 6,219,649 B1 | 4/2001 | Jameson | |
| 6,408,290 B1 | 6/2002 | Thiesson et al. | |
| 2004/0024721 A1 | 2/2004 | Wilfrid Donovan et al. | |
| 2004/0111220 A1 | 6/2004 | Ochs et al. | |
| 2005/0216443 A1 * | 9/2005 | Morton et al. | .................. 707/3 |
| 2006/0112045 A1 * | 5/2006 | Talbot et al. | .................. 706/46 |
| 2006/0294035 A1 * | 12/2006 | Siegel et al. | .................. 706/45 |

FOREIGN PATENT DOCUMENTS

WO   WO 99/67707   12/1999

* cited by examiner

*Primary Examiner*—David R Vincent
*Assistant Examiner*—Kalpana Bharadwaj
(74) *Attorney, Agent, or Firm*—Tarolli, Sundheim, Covell & Tummino LLP

(57) ABSTRACT

Systems and methods are provided for constructing and evaluating a story of interest. The system includes a plurality of decision algorithms. Each decision algorithm is operative to quantify at least one category of uncertainty associated with the story of interest as a set of at least one uncertainty parameter. An uncertainty management component is operative to reconcile the sets of uncertainty parameters from the plurality of decision algorithms as to produce a global uncertainty parameter for each of the plurality of uncertainty categories for the story of interest.

18 Claims, 5 Drawing Sheets

UNCERTAINTY MANAGEMENT IN A DECISION-MAKING SYSTEM

TECHNICAL FIELD

The present invention relates to artificial intelligence and, more particularly, to systems and methods for managing uncertainty in a decision-making system.

BACKGROUND OF THE INVENTION

In the past, decisions frequently had to be made on minimal amounts of available data. Information traveled slowly, and the scope of the information available was within a scale that could be considered by a human mind. Frequently, the greatest problem facing a decision-maker was a paucity of information. Advances in information gathering and transmittal technologies have reversed this trend, making it easier to gather large amounts of information pertaining to a particular problem. A major task facing modern day decision-makers is filtering and organizing the received information into a useful form. But perhaps the most significant challenge is determining how to process the data, accounting for the inherent uncertainties in the data such as conflicts, false information, ambiguities, errors, measurement biases, etc.

While automated classification and decision-making systems have become increasingly sophisticated, the human mind still outperforms automated systems on any real-world tasks that require judgment. One limitation of human decision-making, however, is the inability of human beings to consider a large number of factors simultaneously. Another limitation experienced by human decision-makers is their inability to correctly analyze information with inherent uncertainties or worse, uncertainty induced by processing. Decision-makers often find it difficult to combine large amounts of evidence mentally, and the human tendency is to postpone risky decisions when data are incomplete, or jump to conclusions and refuse to consider conflicting data. Accordingly, automated methods of organizing, combining, correlating, and displaying data that account for the uncertainties in the data can greatly aid human decision-makers.

In attempting to structure and filter the data presented to a human decision-maker, an unfortunate tendency of many decision support systems is to oversimplify the situation presented to the decision-maker. While any real-world decision must consider many different types of uncertainty, this uncertainty is often hidden from the decision-maker by eliminating the context of the information or presenting a single uncertainty value by thresholding. This leaves the decision-maker without explicit information about the uncertainty regarding each "fact" presented as relevant to the pending decision. Implicit information, data thresholding, and loss of context can force the decision-maker to guess about such uncertainty in arriving at a decision or give the decision maker a false sense of security about the situation and their decision. Unfortunately, this can result in sub-optimal decisions, because vital information has in effect been hidden from the decision-maker by the automation system. A parallel situation pertains with regard to automated tools that perform analysis of a situation, and make decisions or recommendations—current practice tends to "hide" the full range of interpretations of the input data, leading to inferior and even inaccurate decisions and recommendations.

SUMMARY OF THE INVENTION

In accordance with one aspect of the present invention, an assisted decision-making system for constructing and evaluating a story of interest is provided. The system includes a plurality of decision algorithms. Each decision algorithm is operative to quantify at least one category of uncertainty associated with the story of interest. An uncertainty category is quantified using at least one uncertainty parameter. An uncertainty management component is operative to reconcile the sets of uncertainty parameters from the plurality of decision algorithms as to produce a global uncertainty parameter for each of the plurality of uncertainty categories for the story of interest.

In accordance with another aspect of the present invention, a method is provided for managing uncertainty in an assisted decision-making system. A story of interest is constructed, comprising an structured argument having a plurality of associated elements, links between elements, evidence supporting the plurality of elements, and a plurality of evidence sources. At least two categories of uncertainty associated with the story of interest are evaluated to produce respective global uncertainty parameters. The global uncertainty parameters are displayed to a decision-maker in conjunction with the relevant decision parameters.

In accordance with yet another aspect of the present invention, a computer readable medium is provided. The computer readable medium contains a plurality of decision algorithms. Each decision algorithm is operative to quantify at least one category of uncertainty associated with the story of interest as a set of at least one uncertainty parameter. An uncertainty management component is operative to reconcile the sets of uncertainty parameters from the plurality of decision algorithms so as to produce a total uncertainty for each of the plurality of uncertainty categories for the story of interest.

DETAILED DESCRIPTION OF INVENTION

The present invention relates to systems and methods for managing uncertainty, such that both the overall uncertainty and a categorical breakdown of the uncertainty can be made available to a decision-maker. One or more exemplary implementations of the present invention can utilize a knowledge base that comprises a plurality of stories, where a story is a structured argument augmented by one or more characteristics of the elements (e.g., states, hypotheses, links, etc.) comprising the structured argument, the evidence associated with the elements, and the content from which the evidence was extracted. The knowledge base can be constructed from executable elements, such that the stories can be manipulated and updated in real time with new evidence. For example, a union or intersection between two stories or portions of stories can be formed, with appropriate parameters calculated from the existing values, without the need for human intervention. This allows the knowledge base to be meaningfully shared between decision-makers who may utilize different bodies of evidence.

Figure 1:
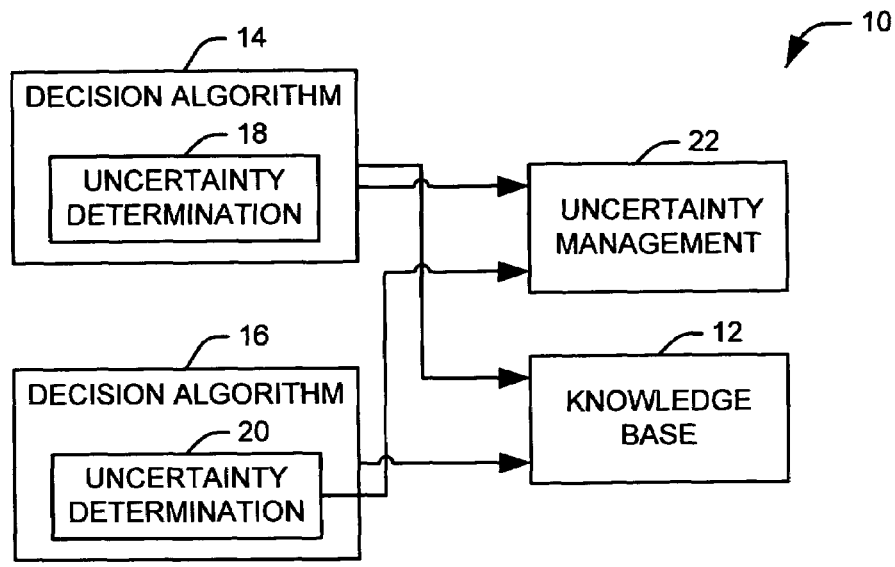
FIG. 1 illustrates an automated system for assisting a human decision-maker in accordance with an aspect of the present invention.

FIG. 1 illustrates an assisted decision-making system 10 in accordance with an aspect of the present invention. The assisted decision-making system 10 comprises a knowledge base 12, containing stories and portions of stories provided at least in part by a plurality of decision networks 14 and 16. The decision algorithms 14 and 16 can comprise, for example, algorithms for extracting data from various evidence sources, finding relationships among the extracted data, generating stories from the extracted data, mining the extracted data, and reasoning inferentially from the stories stored in the knowledge base 12. Evidence, stories, and story fragments provided by the plurality of decision networks can be utilized by a fusion engine to produce a story of interest for a given problem.

The evidence and story fragments provided by the plurality of decision algorithms 14 and 16 introduce a degree of uncertainty into the story of interest. For a given story fragment (e.g., hypothesis, Markov state, evidence, link, or set of linked hypotheses), this uncertainty can be quantified and categorized at respective uncertainty determination components 18 and 20 associated with the decision-making algorithms 14 and 16. The uncertainty determination components 18 and 20 can be configured to account for a plurality of uncertainty categories. The uncertainty calculated at each uncertainty determination component 18 and 20 can be identified as belonging to one of these uncertainty categories and provided to an uncertainty management component 22. The uncertainty management component 22 reconciles the uncertainty from the plurality of decision algorithms 14 and 16. For example, the uncertainty management component 22 can aggregate the various calculated uncertainties within the plurality of categories into respective global uncertainty values, and then produce a unified uncertainty assessment by combining the global uncertainty values for each of the plurality of categories. Each global uncertainty value can be represented as a probability value and an associated confidence interval, and the global uncertainty values can be combined via any appropriate means for combining probability distributions, for example, a root-sum square of the belief values and confidence intervals or sensitivity analysis, such as Monte Carlo. The aggregate uncertainty for each category and the composite uncertainty can be provided to a decision-maker to aid in the decision-making process.

Figure 2:
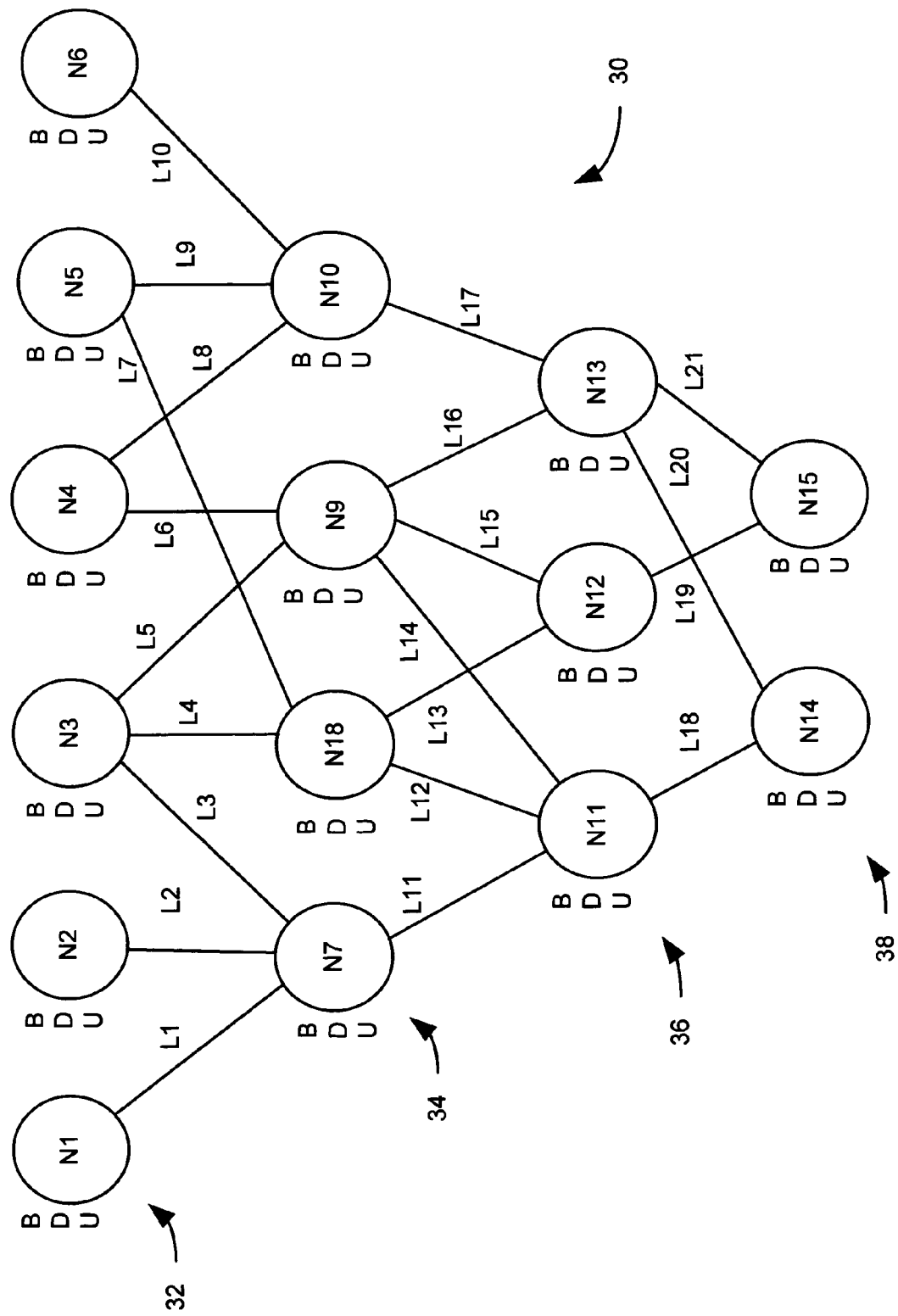
FIG. 2 illustrates a representation of a belief network, as an example of the more general class of structured arguments, in accordance with an aspect of the present invention.

FIG. 2 illustrates a representation of a belief network 30 that can be utilized as part of a story of interest in accordance with an aspect of the present invention. It will be appreciated that other types of structured arguments, such as such as semantic networks, hidden Markov models, and other data fusion algorithms can be utilized to construct stories in accordance with an aspect of the present invention. The belief network 30 includes a top layer 32, a first intermediate layer 34, a second intermediate layer 36, and a bottom layer 38. The top layer 32 includes nodes N1-N6 linked to the first intermediate or hypothesis layer 34 by links or multipliers L1-L10. The first intermediate layer 34 includes nodes N7-N10 linked to the second intermediate layer 34 by links or multipliers L11-L17. The second intermediate layer 36 includes nodes N11-N13 linked to the bottom layer 38 by links or multipliers L18-L21. Each node represents a given variable and hypothesis associated with that variable that can affect the hypotheses of other nodes in lower layers mathematically. Associated with each of the nodes N1-N15 are three parameters, which are a belief parameter B, a disbelief parameter D, and an unknown parameter U. The parameters B, D, and U conform to the Dempster-Shafer evidential interval such that the parameter B, D and U add up to one for each node N1-N15.

The links represent multipliers or weights of a given parameter on a lower node. Link values can be constant, or computed by an algorithm. For example, the belief of node N7 of the first intermediate layer 34 depends on the belief of nodes N1, N2, and N3, each multiplied by its respective link value L1, L2, and L3. Additionally, the disbelief of node N7 of the first intermediate layer 34 depends on the disbelief of nodes N1, N2, and N3, each multiplied by its respective link value L1, L2, and L3. The unknown is computed based on the Dempster-Shafer combination rule. The belief and disbelief of node N7 then propagate to N11 through link L11, which is combined with the belief and disbelief of N18 multiplied by link L12 and the belief and disbelief of node N9 multiplied by link L14. The belief and disbelief of node N11 then propagate to node N14 through link L18 which is combined with the belief and disbelief of N13 multiplied by link L20. The ignorance, or uncertainty, of each row can be evaluated using the Dempster-Shafer combination rule. Similar propagation occurs to provide the beliefs, the disbeliefs, and unknowns of the node N15. It will be appreciated that a story, as defined in the present application, can comprise a belief network that is augmented by information slots, which provide characteristics of links and nodes that answer a detailed version of the reporter's questions (e.g., who, what, where, when, why, how,) accompanied by the certainty or confidence in each element.

Figure 3:
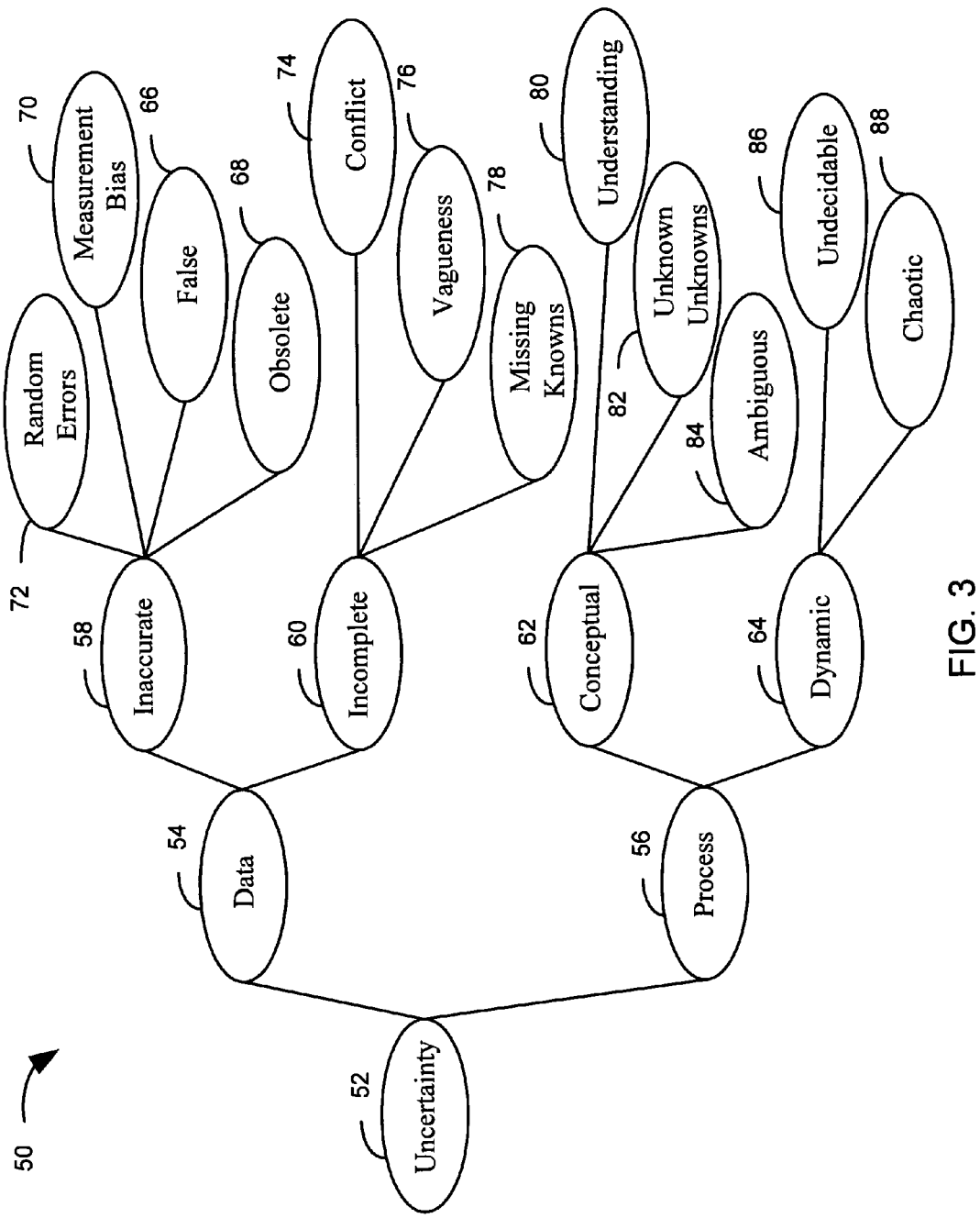
FIG. 3 is a chart illustrating a plurality of uncertainty categories, organized according to their associated properties.

FIG. 3 is a chart 50 illustrating a plurality of uncertainty categories, organized according to their associated properties. The uncertainty 52 in a given decision-making system can be divided into two broad source categories, uncertainty introduced from data 54 and uncertainty introduced by processes 56 associated with the decision-making system. These source categories can each be broken down into two subcategories. Uncertainty in the data can arise from inaccuracy 58 in the data or incompleteness 60 of the data. Uncertainty in processes can be categorized as conceptual uncertainty 62 and dynamic uncertainty 64. It will be appreciated that an understanding of the sources of uncertainty in a decision-making system can allow a decision-maker to better account for the effects of the uncertainty or to take steps to reduce the uncertainty.

Uncertainty due to inaccurate data 58 can be broken down into four uncertainty categories, falsity 66, obsolescence 68, measurement bias 70, and random error 72. Uncertainty due to falsity 66 is uncertainty due to the possibility that data is factually incorrect. The uncertainty caused by this possibility can be quantified using historical data for a provider associated with the data. Uncertainty caused by obsolescence 68 stems from the likelihood that the circumstances reflected by the data have changed since the data was gathered. In an exemplary embodiment, various types of evidence can have associated methods for determining obsolescence, such as obsolescence curves that determine how the reliability of the evidence decays over time. The uncertainty reflected by a given item of evidence at any given time can be determined according the age of the evidence (e.g., the length of time since it was acquired) and these methods. It can be appreciated that the methods are sensitive to the data and the context of that data.

Measurement bias 70 represents possible sampling error in the data provided to the decision-making system. Measurement bias 70 can generally be qualified based on the sampling size utilized for a given measurement and the variance estimated for the sampled population. Finally, uncertainty associated with random error 72 generally arises from statistical data or data expressed as a possibility. A number of methods for quantizing random error 72 in a given probability distribution are known, and one or more of these methods can be utilized for quantifying the error in accordance with an aspect of the present invention.

Uncertainty due to incomplete data 60 can be categorized as conflict 74, vagueness 76, and information known to be missing 78. Uncertainty due to conflict 74 arises when two items of evidence are contradictory, that is, when one item of evidence supports a given hypothesis and another tends to refute the hypothesis. Uncertainty due to conflict 74 can be quantified by assigning belief and disbelief values to the evidence and resolving it via an appropriate combinational rule (e.g., Bayesian or Dempster-Shafer). Uncertainty due to vagueness 76 exists when evidence provided to the decision-making system is qualified. For example, in text evidence, hedge words, such as possibly or probably, can indicate vagueness. The vagueness 76 can be quantified by assigning moderating values (e.g., fuzzy membership functions) to various qualifiers that can be expected for a type of evidence. Known missing information 78 is information about a given hypothesis that is known to be missing, but is not practicable to obtain or is not yet recorded. Missing information can be quantified in a combination rule as an ignorance (or unknown) value associated with the hypotheses or extrapolated from historical data.

Conceptual uncertainty 62 can include three categories, uncertainty due to mistaken understanding 80, unknown missing information 82 (e.g., unknown unknowns), and ambiguity 84. The potential for mistaken understanding 80 exists when a hypothesis can be interpreted multiple ways. This can be quantified by performing a search, for example, a general Internet search, to determine if words or phrases in the hypothesis are subject to multiple meanings. The number of multiple meanings and, possibly, their prevalence in the search, can be utilized in a formula to produce an uncertainty value. Unknown missing information 82 represents information that is missing and is not know to be relevant to the problem of interest, or a link between hypotheses that is not known to the decision-maker or the system. These unknowns are difficult to detect, but, in accordance with an aspect of the present invention, a general estimate of these unknowns can be determined by data mining of other stories in an associated knowledge base or other raw data sources such as an "open world" source like the Internet to find other, similar stories or data that explain the situation. Hypotheses and evidence that are present in these stories can be analyzed to determine analogous evidence and hypotheses that can be incorporated into the story. The amount of new evidence and hypotheses relative to the amount of existing story elements can be used to quantify the uncertainty attributable to the unknown missing information 82. An example of unknown missing information is an unanticipated effect of an action associated with a hypothesis. Uncertainty due to ambiguity 84 can exist when evidence cannot be reliably attributed to a hypothesis. For example, in extracting text evidence, ambiguity can be introduced when the answer to one of the "reporter's questions" (e.g., who, what, when, where, how) is unclear for a given item of evidence. Uncertainty due to ambiguity 84 can be quantified by reviewing one or more confidence levels produced by an algorithm used for evidence extraction.

Uncertainty due to dynamic processes 64 can be divided into two categories, undecidable uncertainty 86 and chaotic uncertainty 88. Undecidable uncertainty reflects the possibility that the problem is ill-posed and that no amount of evidence for the lower ranking hypotheses will provide a threshold level of support for a main hypothesis. The possibility of undecidable error 86 can be quantified by a Monte Carlo analysis of the existing structure of a story. A determined maximum possible belief can be compared to a belief threshold for the story to quantify the undecidable error. Chaotic uncertainty 88 represents dynamic factors that cannot be predicted but their initial conditions have a significant impact on the outcome, such as weather and similar environment factors. Collectively, these factors can be referred to as the "fog-of-war." The variance on the fog-of-war can be modeled as a probability function, and the effects of the fog-of-war can be estimated through sensitivity analysis (e.g., a Monte Carlo analysis) of the story.

Figure 4:
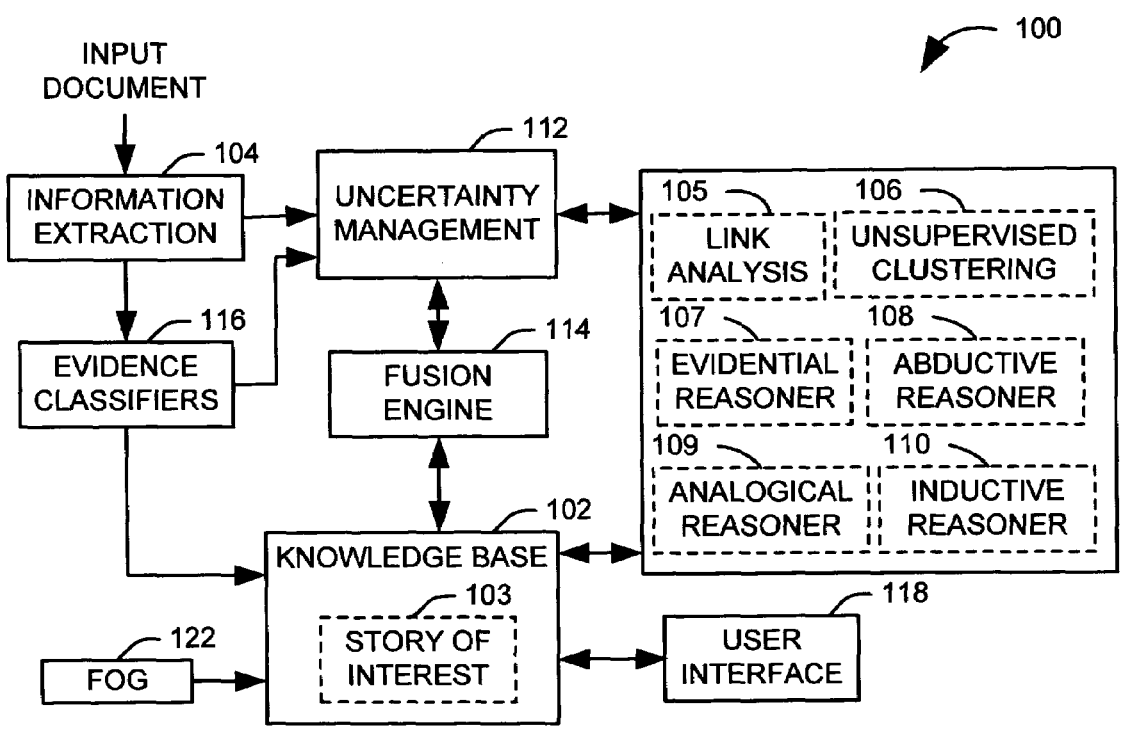
FIG. 4 illustrates an assisted decision-making system, utilizing an executable knowledge base, in accordance with an aspect of the present invention.

FIG. 4 illustrates an assisted decision-making system 100, utilizing an executable knowledge base 102, in accordance with an aspect of the present invention. The knowledge base 102 is comprised of a plurality of stories, where each story comprises an structured argument comprising a plurality of elements, at least one link associated with the plurality of elements, evidence supporting the elements, and a reference (e.g., a pointer) to the context from which the evidence was gathered. Each story can be made executable, such that it can produce mathematically consistent results in response to any change in its associated evidence, belief values, or weights. Accordingly, the stories can be updated and propagated to multiple decision algorithms in real time, allowing for a flexible exchange between a large number of decision algorithms or analysts. The illustrated system 100 allows a decision-maker to construct and evaluate a story representing a problem of interest to the decision-maker. In the illustrated example, the story of interest is represented as an augmented Dempster-Shafer belief network, but it will be appreciated that other argument architectures (e.g., Bayesian Belief Networks, hidden Markov models, etc.) can be used as well. In accordance with an aspect of the present invention, the illustrated system 100 quantifies a plurality of uncertainty categories that can be associated with the story of interest, and allows a decision-maker to account for the determined uncertainty.

It will be appreciated that the illustrated system 100 can be implemented as one or more computer programs, executable on one or more general purpose computers such as a computer hard drive, random access memory, or a removable disk medium. Accordingly, any structures herein described can be implemented as dedicated hardware circuitry for the described function, as a program code stored as part of a computer-assessable memory (e.g., magnetic storage media, flash media, CD and DVD media, etc.), or as a combination of both. Functions carried out by the illustrated system, but not helpful in understanding the claimed invention, are omitted from this diagram. For example, a system implemented as a computer program would require some amount of working memory and routines for accessing this memory. Such matters are understood by those skilled in the art.

In the illustrated example, evidence and stories can be input into the knowledge base 102 and incorporated into the story of interest 103 in a number of ways. For example, an information extraction component 104 can be used to reduce an evidence source, such as a text document or a transcribed conversation, into a desired evidence format. The information extraction component 104 can include hardware scanners, video and audio input jacks, and other hardware devices for receiving the evidence as well as software operative to recognize and analyze the received evidence. This evidence can be incorporated into the story of interest 103 or other stories in the knowledge base 102, or new stories can be assembled in response to the evidence. Stories and portions of stories can also be provided to the story of interest 103 and the knowledge base 102 using a plurality of inferential algorithms 105-110. For example, the inferencing algorithms 105-110 can include an analogical reasoning algorithm 109 (e.g., a case-base reasoning algorithm) that utilizes existing stories in the knowledge base 102 to improve or repair the story of interest 102. Similarly, an abductive reasoning algorithm 110 (e.g., a data mining algorithm) can determine unknown missing information as additional hypotheses and linkages among available hypotheses in the knowledge base 102 to refine the story of interest 103 or other stories within the knowledge base 102.

The information extraction component 104 breaks down raw evidence sources into individual words or phrases, interprets the context and meaning of the various words or phrases, and uses the extracted information to generate a template representing the text segment. The raw evidence may consist of meta-data, voice input, text, or a number of other sources. For example, the information extraction component 104 can look for details relating to an event described in the document, such as the nature of the event, the cause or motivation for the event, the mechanism of the event, the identity of an actor, the location of the event, the time or date of the event, and the magnitude of the event. Each of these details can be added to a template related to the text segment. In accordance with one aspect of the invention, the information extraction component 104 can look for hedge words (e.g., maybe, probably, certainly, never) within the text segment. The information extraction component 104 can use a co-referencing routine to determine what nouns relate to a given hedge word, and use this information to determine the weight of the evidence associated with the template, in the form of belief values and disbelief values.

To provide a greatly simplified example, the information extraction component 104 might receive a statement from a bank teller that they are certain that Mr. Brown has made a deposit of ten-thousand dollars to a corporate account via a personal check at a bank in downtown Atlanta. The information extraction component 104 would locate the nouns within the sentence as well as words such as "via," "at," and "certain" to determine the relationships between the various nouns and the location of certain information. Thus, the question of location can be answered with the noun or string of nouns following "at" (e.g., bank in downtown Atlanta). The mechanism of the event can be determined by the nouns following "via" (e.g., personal check). The magnitude of the event can be determined by finding the numbers (e.g., ten-thousand), and other details can be provided by classifying the remaining nouns (e.g., Mr. Brown is likely the actor; the event is likely a deposit, etc.). The phrase "almost certain," once it is verified that it is referring the deposit, can be used to assign a high belief value to the event.

Several categories of uncertainty associated with a story of interest 103 can be recognized and accounted for at this point in the decision-making process by determining various categories of uncertainty inherent in the evidence comprising the story of interest. For example, a given evidence source can be vague, containing qualifiers or hedge words, or ambiguous. Similarly, the evidence could be false, obsolete, contain measurement errors, or a given measurement or sampled population within the evidence source can contain random error. Important information can be missing from a given source, and evidence can conflict within or among evidence sources. It will be appreciated that knowledge about the amount of uncertainty inherent in the evidence, as well as the nature of the uncertainty, can be important in the decision-making process.

In accordance with an aspect of the present invention, the uncertainty due to each of these factors can be quantified at the information extraction component 104. Vagueness about the information for a given item of evidence can be determined by assigning probability values or fuzzy membership functions to various hedge words associated with the evidence source. Ambiguity can be determined from one or more confidence levels associated with the information extraction. For example, the ambiguity can be determined from a confidence value produced by classification system used to organize the information into the evidence template or from a tonal evaluation in vocal information. Incomplete evidence, referred to as known missing information, can be identified by evaluating the missing fields within the evidence template. An uncertainty value for known missing information can be determined according to a-priori' values for the various missing fields in the evidence template.

The possibility that evidence is false can also be evaluated at the information extraction component 104. An associated provider for the evidence can be determined from the raw evidence, and an appropriate possibility of falsity can be determined from the historical performance of the provider. Similarly, obsolescence can be determined according to obsolescence curves associated with various types of evidence. The obsolescence curves dictate a rate at which confidence in a given item of evidence decays with time. The uncertainty associated with obsolescence can be calculated from the age of the evidence and the obsolescence curves. Measurement errors within the evidence can be calculated from data associated with the evidence, for example, an associated sampling size or degree of precision in a measurement tool. Generally, these items can be extracted from the evidence itself, for example, as a confidence interval associated with a given measurement, and converted into uncertainty values. Finally, there can be random error associated with a given item of evidence. Like the measurement bias, the data necessary to quantify random error can be extracted from the evidence itself, generally as a probability expressed in the evidence.

In accordance with an aspect of the invention, the values determined for each category of uncertainty associated with a given item of evidence can be provided to the uncertainty management component 112 for evaluation and reconciled into global uncertainty values for the plurality of uncertainty categories. The uncertainty management component 112 can operate in concert with a fusion engine 114 associated with the system to produce the global uncertainty values. For example, the values associated with a given evidence template for each category can be expressed as belief and disbelief values and fused with belief and disbelief values representing other evidence within the story of interest 103 via an appropriate combinational rule to determine a global uncertainty value for the category within the story.

The extracted evidence can be provided to one or more evidence classifiers 116. The evidence classifiers 116 assign the evidence to associated hypotheses according to the evidence content. It will be appreciated that the evidence classifiers 116 can assign the evidence to one or more existing hypotheses in the knowledge base 102 or generate a new hypothesis (e.g., from a large independent ontology or rule base). The hypotheses within each network can be derived from previously generated networks, new hypotheses added to accommodate additional evidence, and a priori knowledge of the problem added by an analyst through a user interface 118. In an exemplary embodiment, the evidence classifiers 110 can include a rule-based classifier that classifies the evidence according to a set of user defined rules. For example, rules can be defined relating to the fields within the template or the source of the data. Other classifiers can include, for example, supervised and unsupervised neural network classifiers, semantic network classifiers, statistical classifiers, and other classifier algorithms. These classifiers can be orchestrated to increase the efficiency of the classification. For example, the rule-based classifier can be applied first, and if a rule is not actuated, the statistical classifier can be used. If a pre-specified probability threshold is not reached at the statistical classifier, the semantic distance classifier can be applied and the results shown to the decision-maker for validation. The extracted data can be stored in the knowledge base or incorporated into the story of interest at a fusion engine 114. The fusion engine 114 fuses the data into the belief network according to one of a plurality of combinational rules, such as a Dempster-Shafer combinational rule, a Bayesian combinational rule, an averaging rule, a logical AND, a logical OR, an optimistic rule that uses the largest belief value from a plurality of values, and a pessimistic rule that uses the smallest belief value from a plurality of values.

Conflicting evidence associated with a given hypothesis can be identified when new evidence and hypotheses are fused into the story of interest. For example, a given item of evidence can have associated belief or disbelief values relative to a given hypothesis. The belief and disbelief values associated with conflicting evidence can be combined via an appropriate combination rule associated with the fusion engine to provide overall belief and disbelief values for the hypothesis. The uncertainty due to this conflict can be quantified by calculating the effect of the hypothesis containing the conflicting evidence on a main hypothesis associated with the story of interest according to the link strengths of the intervening links between the conflicted hypothesis and the main hypothesis. Similarly, new hypotheses generated at the evidence classifiers can be evaluated to determine the potential for misunderstanding of the hypotheses as an understanding uncertainty. For example, the Internet or one or more external databases can be searched for one or more words or phrases associated with a given hypothesis. The number of meanings determined in the search, the strength of connection to the hypotheses of interest and their associated characteristics, and the prevalence of their usage can be used to quantify the likelihood of misunderstandings of the hypothesis according to a predetermined formula or sensitivity analysis method.

The inferencing algorithms 105-110 search the knowledge base 102 for unanticipated story fragments, comprising at least a single new hypothesis, and more typical of story fragments comprising linked hypotheses and any associated evidence. The inferencing algorithms 105-110 can identify unknown missing information within the story of interest 103, that is, evidence and hypotheses that are not yet accounted for within the story of interest, and propose one or more story fragments from the knowledge base to the decision-maker for possible incorporation into the story of interest. The plurality of inferencing algorithms 105-110 can include any of a variety of appropriate algorithms for evaluating stored data to determine significant patterns and trends within the stories comprising the knowledge base 102. In the illustrated example, the plurality of inferencing algorithms include a link analysis component 105 that can be used to compute link values between existing hypotheses based on the characteristics of the hypotheses. When new evidence creates a significant change in the strength of a link or provides the basis for a new link, the new link data can be provided as candidate for missing information that was not previously known.

The plurality of inferencing algorithms can further include an unsupervised clustering algorithm 106. In the unsupervised clustering algorithm 106, evidence templates are grouped according to their associated characteristics. These clusters can provide an indication of previously unknown hypotheses. Further, the unsupervised clustering shows the changes in the density of evidence in support of various existing hypotheses. This may be an indicator of missing information not previously known to be associated with the changed hypotheses. Another inferencing algorithm can utilize an evidential reasoner 107 that reviews new stories in the knowledge base to determine which story fragments and other bits of evidence that are related to, but not represented in, a story of interest 103. The unaccounted for fragments can represent unknown missing information.

An abductive reasoner 108 can be used to find the best explanation for new data using positive and negative examples of evidence drawn from past stories that relate to the story of interest 103. The output of the abductive reasoner 108 is provided in a hierarchically structured way with different degrees of granularity computed that compresses the information represented in a decision network. New hypotheses or linked groups of hypotheses can be extracted from this network as unknown unknowns. One example of an abductive reasoning algorithm is the SUBDUE algorithm developed at the University of Texas at Arlington. An analogical reasoner 109 can examine the similarity between the present state of the story of interest 103 and past successful decision networks. The analogical reasoner 109 finds successful cases in the knowledge base that are most similar to the present state of the story of interest 103 and suggests differences in hypotheses based on the successful cases.

An inductive reasoner 110 computes changes in rules based on new evidence within the knowledge base. The change is based on rule induction, using the old evidence supporting the old structure along with exceptions to the old rules in the existing evidence to induce new rules that better account for the entire body of old and new evidence. In essence, new rules defining a revised network structure are computed from an aggregate of old and new evidence. In one implementation, the Weka algorithm can be utilized within the inductive reasoner 110. It will be appreciated that other inferential algorithms can be utilized in accordance with an aspect of the present invention. The fusion engine 114 mathematically reconciles the story of interest 103 in light of the story fragments provided by the inferencing algorithms 105-110. The impact of the unknown missing information on the uncertainty associated with the story of interest can be quantified by comparing a new belief value associated with a main hypothesis in the story of interest after the new story fragments have been incorporated with the previous belief value for the main hypothesis.

The uncertainty management component 112 can operate in concert with the fusion engine 114 to evaluate the structure of the story of interest 103 and quantify an uncertainty due to undecidable uncertainty within the network. In the illustrated example, this is accomplished via a Monte Carlo simulation. Each hypothesis within the story of interest 103 can be modeled as a probability distribution, according to associated belief, disbelief, and uncertainty values. The relationship between these distributions and a probability value associated with a main hypothesis in the story 103 can be determined via the strength of the links connecting the various hypotheses within the stories. The Monte Carlo simulation determines a probability distribution for the proposition that the existing hypothesis within the network will provide sufficient support to the main hypothesis as to exceed a threshold belief value. This threshold can be determined for a given story by an analyst through the user interface 118. If the determined likelihood of achieving the threshold is small, the story 103 is unlikely to provide satisfactory insight into the problem of interest for the decision-maker. The probability distribution provided by the Monte Carlo analysis provides an indication of the undecidable error within the story of interest 103.

Chaotic uncertainty for the system can be determined according to a simulation model that accounts for the uncertainty in initial conditions 122. The simulation algorithm 122 perturbs link strengths and belief values associated with the story of interest 103 to simulate the effects of chaotic influences on the decision-making process. A decision-maker can specify the frequency and severity associated with perturbation of the conditions according to a desired application at the user interface 118. An uncertainty value for chaotic uncertainty can be determined by repeating the simulation model using different starting conditions over a number of trials in a Monte Carlo analysis. A probability distribution for the belief value of the main node can be determined from this analysis.

Once the various categories of uncertainty for the system have been determined, the results for each category and for the total uncertainty associated with the story of interest 103 can be displayed to a decision-maker in an appropriate form via the user interface 118. For example, the results can be displayed in an appropriately formatted chart, in a graph, or according to one or more changes in the appearance of the story of interest on a main screen. For example, the hue, brightness, or saturation of one of the nodes can be altered to indicate the presence of an uncertainty at a given hypothesis that exceeds a threshold value. In an exemplary embodiment, a summary of the total uncertainty for each category can be displayed to the decision-maker as a Kiviat diagram. It will be appreciated that the uncertainty values determined for individual hypotheses and items of evidence can be retained during the calculation of the total uncertainty, such that the decision-maker can review the story 103 to determine any evidence or hypotheses that represent the source of the determined uncertainty which can be highlighted and presented to the decision-maker in any number of ways. Accordingly, specific action can be taken to reduce uncertainty in the decision-making process.

Figure 5:
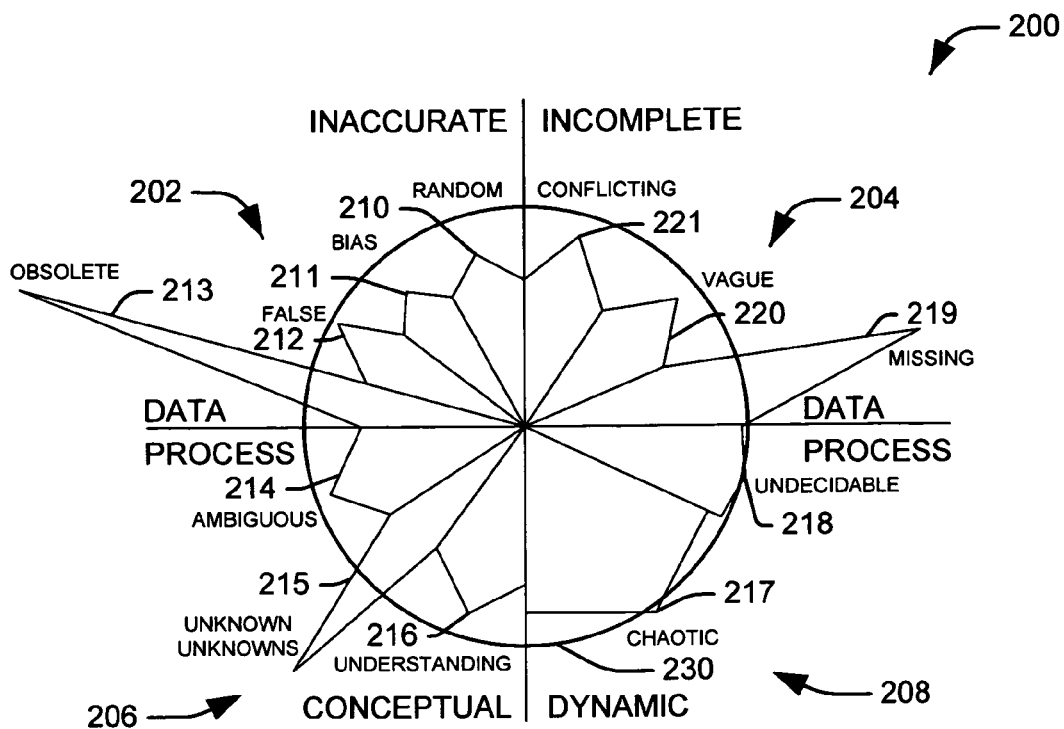
FIG. 5 illustrates an exemplary Kiviat diagram for displaying uncertainty associated with a story of interest to a decision-maker.

FIG. 5 illustrates an exemplary Kiviat diagram 200 for displaying uncertainty associated with a story of interest to a decision-maker. The displayed uncertainty allows a decision-maker to consider the sources of the uncertainty associated with the story of interest and take steps to reduce the uncertainty or mitigate its effects. One method for presenting the uncertainty to the decision maker, the Kiviat diagram, 200 can be divided into four quadrants, each representing a different class of uncertainty. For example, a first quadrant 202 can represent uncertainty due to inaccurate data, a second quadrant 204 can represent uncertainty due to incomplete data, a third quadrant 206 can represent uncertainty due to conceptual processing errors, and a fourth quadrant 208 can represent uncertainty due to dynamic processing errors. Each quadrant can contain one or more spokes 210-221 representing specific uncertainty categories within the broad uncertainty category associated with the quadrant.

Each of the plurality of spokes 210-221 graphically illustrates an associated value for an associated uncertainty category. The length of a given spoke indicates the magnitude of uncertainty associated with an uncertainty category. Accordingly, the magnitude of the uncertainty for each category can be appreciated relative to the uncertainty for the other categories and a predetermined threshold 230. For example, the longest spoke 215, representing uncertainty due to obsolete data, can indicate that obsolete data is the largest source of uncertainty in the story of interest. This may indicate to a decision-maker that a decision should be postponed until current data can be obtained for the system. The other spokes 213 and 219 that extend significantly beyond the threshold represent uncertainty due to known missing data and uncertainty due to unknown missing information. Accordingly, it can be concluded that additional data would be helpful in reducing the associated uncertainty of the story of interest, and the cost of obtaining the desired data can be weighed against the expected reduction in uncertainty.

Figure 6:
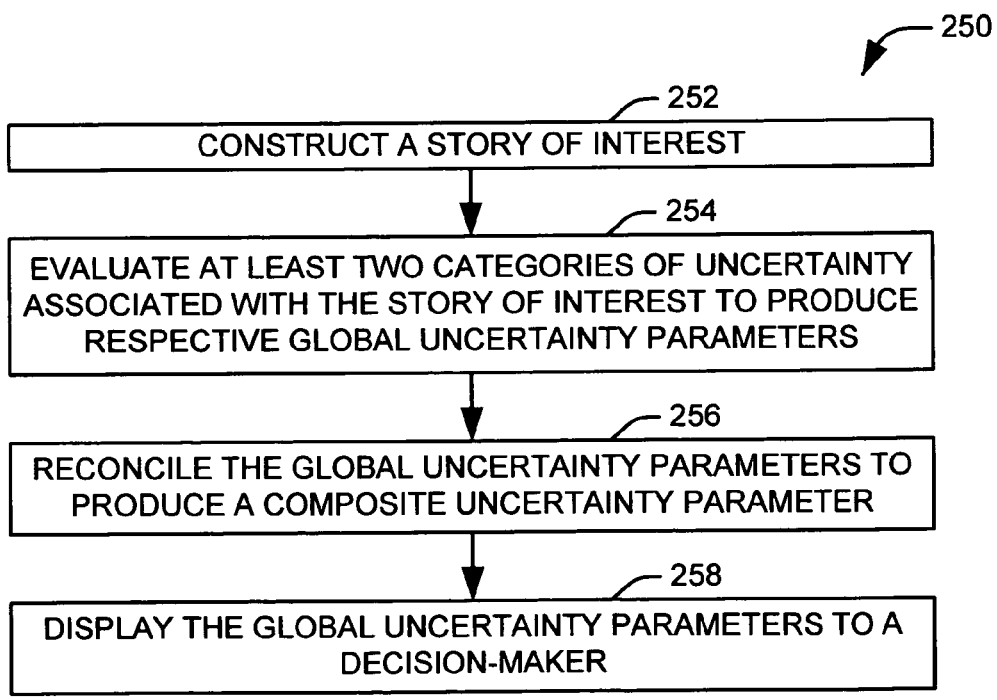
FIG. 6 illustrates a methodology for managing uncertainty associated with a story of interest within an assisted decision-making system

In view of the foregoing structural and functional features described above, methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates a methodology 250 for managing uncertainty associated with a story of interest within an assisted decision-making system in accordance with an aspect of the present invention. At 252, a story of interest is constructed from existing evidence sources. The story of interest can be constructed as an augmented belief network comprising a plurality of hypotheses, at least one link associated with the plurality of hypotheses, evidence supporting the plurality of hypotheses, and a plurality of sources associated with the evidence. The story of interest can be constructed, at least in part, by a plurality of decision algorithms that construct, evaluate, and organize the plurality of hypotheses according to the evidence sources and an associated knowledge base comprising previously constructed stories. It will be appreciated that the decision algorithms operate under a certain degree of uncertainty due to the provided data and the processes used to construct the story of interest.

At 254, at least two categories of uncertainty associated with the story of interest are evaluated to produce respective global uncertainty parameters. It will be appreciated that the uncertainty parameters are not necessarily scalar values, and they can comprise, for example, a probability value and an associated confidence interval. For example, uncertainty associated with individual hypotheses can be fused to indicate an overall uncertainty. This uncertainty at each hypothesis can take a number of forms, such as an understanding uncertainty representing the likelihood that a hypothesis will be "misunderstood", when evidence is assigned to the hypotheses. This likelihood can be quantified based on a search of an external database for alternative meanings of various words and phrases within the hypothesis. Similarly, a Monte Carlo analysis of the story of interest can be used to analyze the uncertainty due to undecidability, representing the likelihood that the story of interest will not produce sufficient support for a main hypothesis given the present structure of the story.

At 256, the global uncertainty parameters are reconciled to produce a composite uncertainty parameter for the story of interest. For example, one method for reconciling multiple uncertainty parameters is to determine the square root of the summed squared values of the uncertainty parameters, and another method would employ a Monte Carlo analysis of probability distributions represented by the uncertainty parameters. The global uncertainty values and the composite uncertainty parameter can be displayed to a decision-maker at 258. In an exemplary implementation, the uncertainty parameters can be displayed as a Kiviat diagram.

Figure 7:
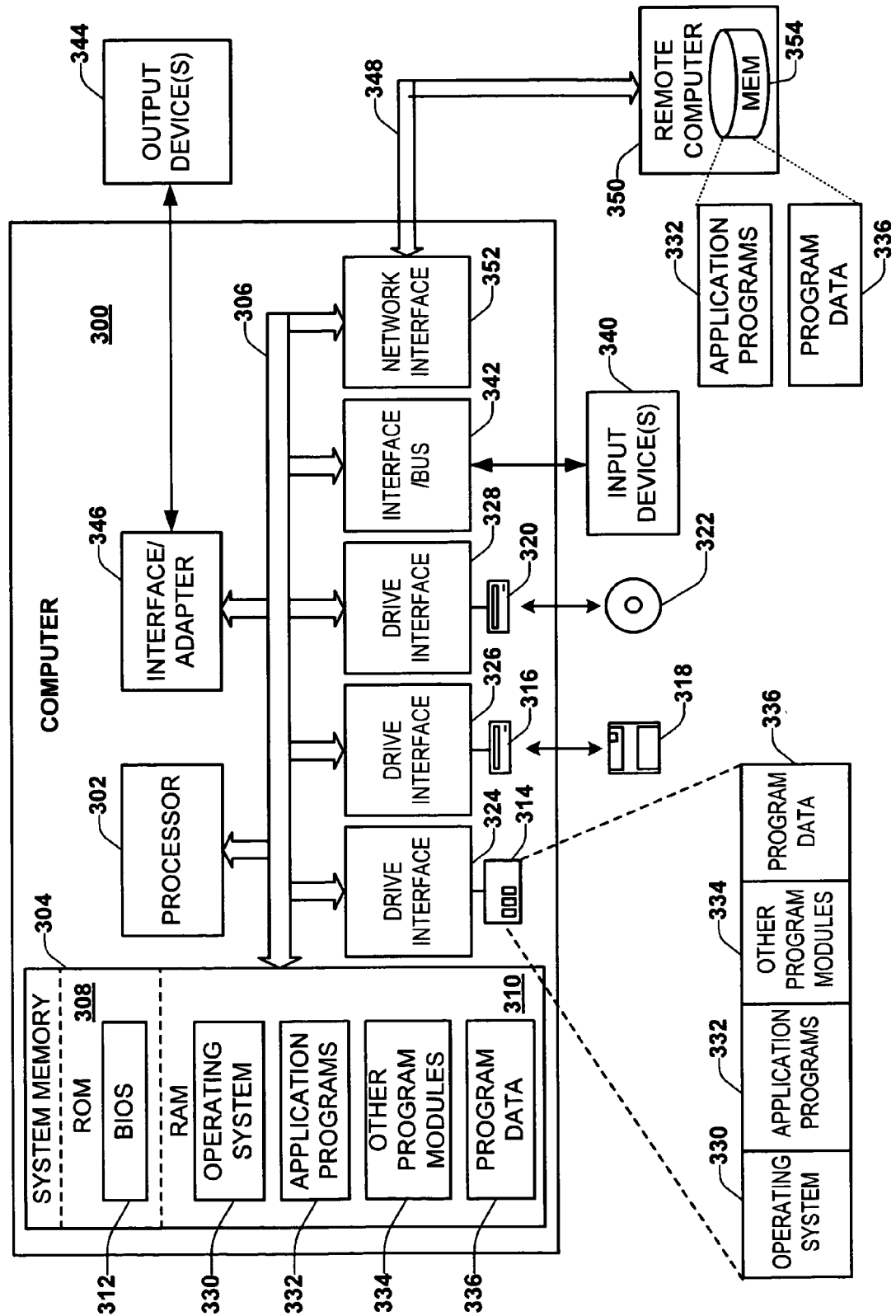
FIG. 7 illustrates a schematic block diagram of an exemplary operating environment for a system configured in accordance with an aspect of the present invention.

FIG. 7 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Multi-processor architectures can also be utilized as the processor 302 as the process is asynchronous and inherently parallel. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like. The computer system can include any number of input devices for accessing evidence to be processed including audio processor channels, image recognition and analysis machinery, scanners, and or network connections to information sources such as the Internet or other data repositories.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard or a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A computer implemented assisted decision-making system for constructing and evaluating a story of interest comprising:
a plurality of decision algorithms, each decision algorithm quantifying at least one category of uncertainty associated with the story of interest as at least one uncertainty parameter, the plurality of decision algorithms comprising an information extraction component that reduces evidence sources into a desired format; and
an uncertainty management component that reconciles the uncertainty parameters from the plurality of decision algorithms as to produce a global uncertainty parameter for each of the plurality of uncertainty categories for the story of interest, and provides a unified uncertainty assessment by combining the global uncertainty parameters for each of the plurality of uncertainty categories for the story of interest.

2. The system of claim 1, the at least one category of uncertainty quantified by the information extraction component including an uncertainty due to vague evidence, the information extraction component quantifying the uncertainty according to hedge words found within an associated evidence source.

3. The system of claim 1, the at least one category of uncertainty quantified by the information extraction component including an uncertainty due to evidence and hypotheses that are known to be missing, the information extraction component quantifying the uncertainty according to missing entries in an evidence template associated with the desired format.

4. The system of claim 1, the at least one category of uncertainty quantified by the information extraction component including an uncertainty due to ambiguous evidence, the information extraction component utilizing a classification system to reduce the evidence sources and quantifying the uncertainty according to a confidence value generated by the classification system.

5. The system of claim 1, the at least one category of uncertainty quantified by the information extraction component including uncertainty due to false evidence, the information extraction component quantifying the uncertainty according to at least one of the historical performance of a provider of the evidence or a comparison of multiple sources to resolve and discount false evidence.

6. The system of claim 1, the at least one category of uncertainty quantified by the information extraction component including an uncertainty due to obsolete evidence, the information extraction component quantifying the uncertainty according to an associated age of the evidence and at least one obsolescence method that defines a rate at which confidence in a given item of evidence decays over time.

7. The system of claim 1, the at least one category of uncertainty quantified by the information extraction component including uncertainty due to measurement error.

8. The system of claim 1, the at least one category of uncertainty quantified by the information extraction component including uncertainty due to random error.

9. The system of claim 1, further comprising a knowledge base comprising a plurality of executable stories, a given executable story comprising a belief network containing a plurality of associated hypothesis and evidence associated with the at least one hypothesis.

10. The system of claim 9, the system further comprising at least one inferencing algorithm that examines existing hypothesis within executable stories stored in the knowledge base to determine one or more appropriate hypotheses for a body of evidence.

11. The system of claim 10, the at least one category of uncertainty quantified by the at least one inferencing algorithm including an uncertainty due to unknown missing information.

12. A method for managing uncertainty in an assisted decision-making system:
constructing a story of interest, the story of interest comprising a structured argument having a plurality of associated elements, at least one link associated with the plurality of elements, evidence supporting the plurality of hypotheses, and a plurality of evidence sources;
searching an external database for at least one phrase associated with a given element associated with the story of interest;
determining an uncertainty parameter that represents an uncertainty due to misunderstandings of the element based on the results of the search;
evaluating at least two categories of uncertainty associated with the story of interest to produce respective global uncertainty parameters, wherein evaluating a first category of uncertainty comprises reconciling uncertainty parameters representing a plurality of hypotheses to provide a first global uncertainty parameter representing uncertainty due to misunderstood elements; and
displaying the global uncertainty parameters to a decision-maker.

13. The method of claim 12, further comprising reconciling the global uncertainty parameters as to produce a composite uncertainty parameter for the story of interest.

14. The method of claim 12, further comprising:
conducting a sensitivity analysis of the story of interest to evaluate the likelihood that the story can produce a satisfactory level of belief associated with a main hypothesis associated with the story of interest; and
producing a global uncertainty parameter representing the likelihood that insufficient evidence exists to support the main hypothesis associated with the story of interest from sensitivity analysis.

15. The method of claim 12, wherein displaying the global uncertainty parameters to the decision-maker includes displaying uncertainty to the decision-maker via a graphical representation.

16. A computer readable medium comprising:
a plurality of decision algorithms, each decision algorithm quantifying at least one category of uncertainty associated with the story of interest as at least one uncertainty parameter, the plurality of decision algorithms comprising an information extraction component that reduces evidence sources into a desired format; and
an uncertainty management component that reconciles the uncertainty parameters from the plurality of decision algorithms so as to produce a total uncertainty for each of the plurality of uncertainty categories for the story of interest and that combines the total uncertainty for each of the plurality of uncertainty categories for the story of interest to provide a unified uncertainty assessment.

17. The computer readable medium of claim 16, comprising a fusion engine that mathematically reconciles the story of interest when data within the story of interest is altered, the fusion engine determines an uncertainty parameter representing conflicting evidence for at least one hypothesis comprising the story of interest.

18. The computer readable medium of claim 16, further comprising a simulation component that perturbs at least one value within the story of interest according to a model, the simulation component determines an uncertainty parameter representing chaotic uncertainty by conducting a sensitivity analysis of the effects of the perturbation of the at least one value on a main hypothesis within the story of interest.

* * * * *